(12) United States Patent
Coureux

(10) Patent No.: US 11,915,867 B2
(45) Date of Patent: Feb. 27, 2024

(54) LVDT WITH INTEGRATED ANTI-ROTATION

(71) Applicant: Goodrich Actuation Systems SAS, Saint Ouen l'Aumone (FR)

(72) Inventor: Sebastien Coureux, Herblay (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 33 days.

(21) Appl. No.: 17/572,880

(22) Filed: Jan. 11, 2022

(65) Prior Publication Data
US 2022/0230795 A1    Jul. 21, 2022

(30) Foreign Application Priority Data

Jan. 15, 2021  (EP) .................................... 21305048

(51) Int. Cl.
*H01F 7/121*    (2006.01)
*H01F 7/08*    (2006.01)

(52) U.S. Cl.
CPC ............ *H01F 7/081* (2013.01); *H01F 7/121* (2013.01); *H01F 2007/086* (2013.01)

(58) Field of Classification Search
CPC .... H01F 7/081; H01F 7/121; H01F 2007/086; H02K 7/116; H02K 11/20; H02K 11/225; H02K 7/00
USPC ........................................................ 335/279
See application file for complete search history.

(56) References Cited

U.S. PATENT DOCUMENTS

| 4,841,844 | A | * | 6/1989 | Tootle ..................... B64C 13/00 74/89.17 |
| 7,540,467 | B2 | | 6/2009 | Roundy |
| 9,797,490 | B2 | | 10/2017 | Marvin et al. |
| 2006/0270330 | A1 | * | 11/2006 | Schmid ................... F16C 31/02 452/58 |
| 2008/0203337 | A1 | | 8/2008 | Roundy |
| 2015/0276029 | A1 | * | 10/2015 | Marvin ................. B64C 13/341 74/89.29 |

(Continued)

FOREIGN PATENT DOCUMENTS

| EP | 1548327 A1 | 6/2005 |
| EP | 1731421 A1 | 12/2006 |
| EP | 1965113 A1 | 9/2008 |

OTHER PUBLICATIONS

European Search Report for Application No. 21305048.7, dated Jun. 25, 2021, 10 pages.

*Primary Examiner* — Shawki S Ismail
*Assistant Examiner* — Lisa N Homza
(74) *Attorney, Agent, or Firm* — CANTOR COLBURN LLP

(57) ABSTRACT

An electromechanical actuator includes: an actuator rod housed in an actuator housing; a linear variable differential transformer "LVDT" fixed to the actuator housing; and an anti-rotation component configured to contact the outer surface of said LVDT. The outer surface of the linear variable differential transformer comprises a first anti-rotation surface feature and the anti-rotation component comprises a second anti-rotation surface feature. The first and second anti-rotation features are sized and shaped relative to each other such that, when in contact with each other, they are configured to prevent rotation of the actuator rod in use.

10 Claims, 3 Drawing Sheets

(56) References Cited

U.S. PATENT DOCUMENTS

2016/0123275 A1* 5/2016 Arnaud .................. F02K 1/763
74/89.39

* cited by examiner

LVDT WITH INTEGRATED ANTI-ROTATION

CROSS-REFERENCE TO RELATED APPLICATIONS

This application claims priority to European Patent Application No. 21305048.7 filed Jan. 15, 2021, the entire contents of which is incorporated herein by reference.

FIELD OF TECHNOLOGY

The examples described herein relate to linear variable differential transformers (LVDTs).

BACKGROUND

LVDTs are a common type of electromechanical transducer that can convert the rectilinear motion of an object to which it is coupled mechanically into a corresponding electrical signal.

LVDTs have been widely used in different applications such as in power turbines, hydraulics, aircraft, to name a few. An LVDT functions by converting a position or linear displacement from a mechanical reference (zero or null position) into a proportional electrical signal containing phase (for direction) and amplitude (for distance) information. The LVDT operation does not require an electrical contact between the moving part (probe or core assembly) and the coil assembly, but instead relies on electromagnetic coupling. They may therefore be described as absolute linear position/displacement transducers and are inherently frictionless.

SUMMARY

An electromechanical actuator is described herein comprising: an actuator rod housed in an actuator housing; a linear variable differential transformer "LVDT" fixed to the actuator housing; an anti-rotation component configured to contact the outer surface of said LVDT; wherein said outer surface of the linear variable differential transformer comprises a first anti-rotation surface feature and wherein said anti-rotation component comprises a second anti-rotation surface feature, and wherein said first and second anti-rotation features are sized and shaped relative to each other such that, when in contact with each other, they are configured to prevent rotation of the actuator rod in use.

In some of the examples described herein, the electromechanical actuator may further comprise a motor and a mechanical converter configured to transform torque produced by the motor into linear force applied to said actuator rod.

In some of the examples described herein, said anti-rotation component may be positioned between the mechanical converter and the LVDT in use.

In some of the examples described herein, the actuator rod comprises a hollow cylindrical region surrounding the LVDT.

In some of the examples described herein, said anti-rotation component is positioned between the actuator rod and the linear variable differential transformer in use.

In some of the examples described herein, the LVDT extends along a central longitudinal axis X' between a first longitudinal end and a second longitudinal end.

In some of the examples described herein, said anti-rotation surface features may be provided at said first end of the LVDT.

In some of the examples described herein, the anti-rotation component may be directly machined onto the inner surface of the actuator rod and be positioned around the external surface of the LVDT.

In some examples the anti-rotation surface features may be formed by machining methods.

In some of the examples described herein, said anti-rotation surface features may comprise splines, keys or square shaped sections.

A method of preventing rotation of an actuator rod in an electromechanical actuator is also described herein comprising: providing said actuator rod housed in an actuator housing; providing a linear variable differential transformer "LVDT" fixed to the actuator housing; providing an anti-rotation component configured to contact the outer surface of said LVDT; providing a first anti-rotation surface feature or features on said outer surface of the linear variable differential transformer and providing a second anti-rotation surface feature or features on said anti-rotation component, and wherein said first and second anti-rotation features are sized and shaped relative to each other such that, when in contact with each other, they are configured to prevent rotation of the actuator rod in use.

In some of the examples the method may further comprise providing a motor and a mechanical converter, configured to transform torque produced by the motor into linear force applied to said actuator rod.

In some of the examples the method may further comprise positioning said anti-rotation component between the mechanical converter and the LVDT in use.

In some of the examples the method may further comprise providing the actuator rod to comprise a hollow cylindrical region surrounding the LVDT.

In some of the examples the method may further comprise positioning the anti-rotation component between the actuator rod and the LVDT in use.

In some of the examples the anti-rotation surface features are splines, keys or square shaped sections.

BRIEF DESCRIPTION OF THE FIGURES

The following descriptions should not be considered limiting in any way. With reference to the accompanying drawings, like elements are numbered alike.

DETAILED DESCRIPTION

Figure 1:
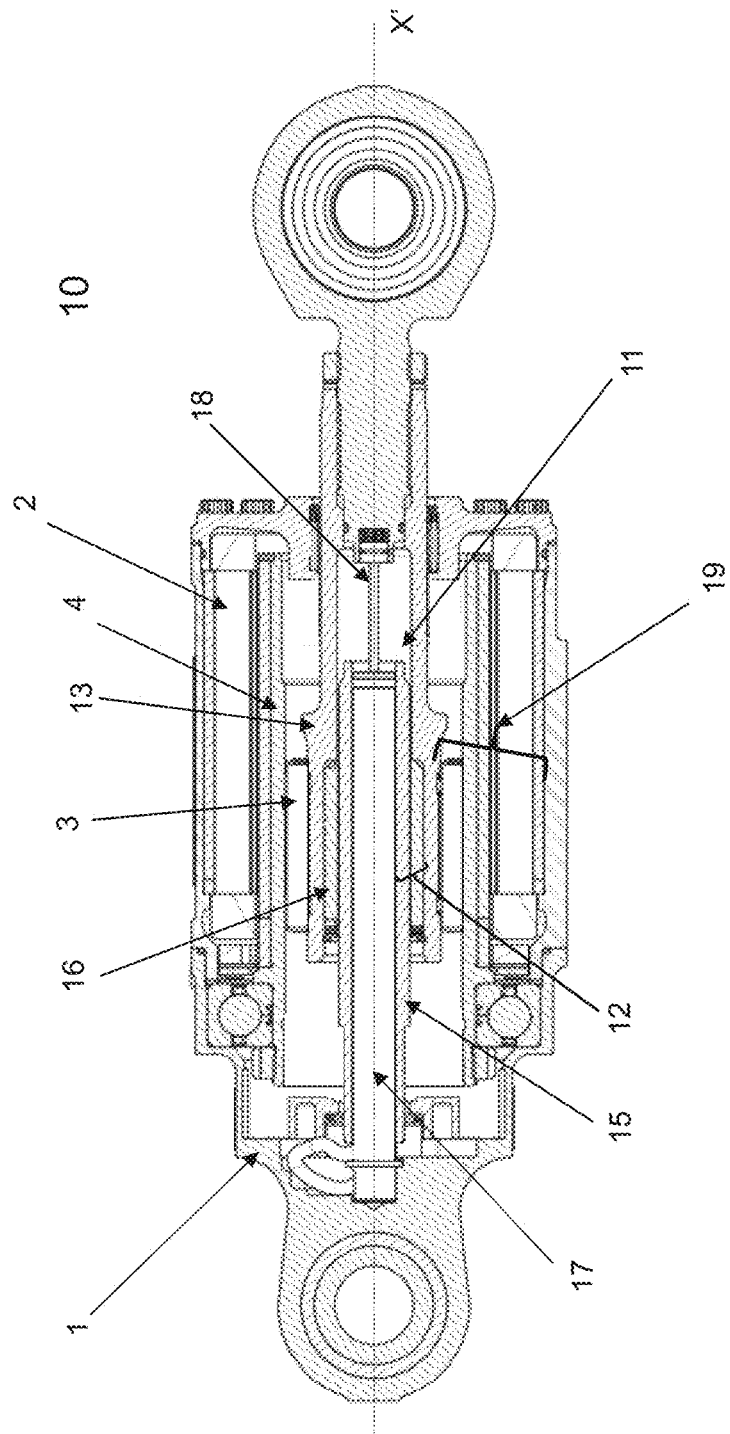
FIG. 1 shows a known LVDT in use in an EMA.
Figure 4:
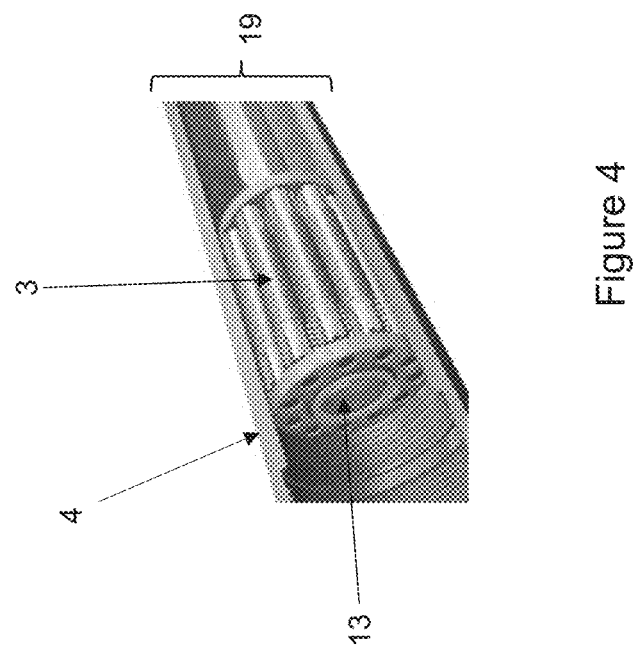
FIG. 4 shows a mechanical converter and actuator rod.

A known electromechanical actuator (EMA) 10 comprising a linear variable differential transformer (LVDT) sensor 11 is shown in FIG. 1. The EMA 10 is electrically powered and is configured to receive a position order from a control computer (not shown). In order to execute this position order, the electrical motor 2 is energised and applies a mechanical torque to the EMA 10. As the EMA output movement is linear, the rotation of the motor is converted into linear motion by a mechanical converter 19 such as a ballscrew or rollerscrew system. Other means may also be used. As shown in FIG. 4, the mechanical converter 19 may comprise a rotational part 4 driven by the motor 2, converter elements 3 which may be rollers or balls, and a linear output element, which may be considered a separate component to the mechanical converter 19 and which in the context of this invention is the actuator rod 13.

It can be seen that the LVDT 11 comprises an elongate body having a longitudinal axis X'. In order to stop rotation of the actuator rod 13, the EMA comprises a separate anti-rotation device 12.

In order to output a purely linear motion of the actuator rod 13, it is necessary to prevent the rotation of the output of the mechanical converter. In known systems, the rotation of this mechanical converter output is prevented by a dedicated anti-rotation device 12. In these known linear EMAs, an LVDT 11 is provided as a separate discrete component to the anti-rotation device 12. The anti-rotation device 12 must be used and located in the same area as the actuator rod 13 and along its axis X' (which corresponds to the axis X' of the EMA 10). Due to their own design constraints, which are closely related to the functions to be satisfied and technologies, the size of the envelope taken up by both of these components 11, 12, is important.

The anti-rotation device 12 comprises a fixed component 15 and a mobile component 16. The mobile component 16 of the anti-rotation device 12 is attached to an actuator rod 13 and cannot rotate around its own central axis X', by virtue of coupling with the fixed component 15, thereby preventing rotational movement. The fixed component 15 of the anti-rotation device 12 is fixed to the actuator housing 1. The mobile component 16 as shown in FIG. 1 is positioned between the actuator rod 13 and the fixed component 15. This mobile component 16 is not fixed relative to the actuator housing 1, but is instead considered to be a linearly mobile component in use and is attached to the actuator rod 13.

The LVDT 11 also typically has two parts; a mobile component 18, the LVDT rod, which may include a probe (not shown) and a fixed component, the LVDT body 17, which may include a coil (not shown). The LVDT body 17 is fixed in place relative to the actuator housing 1 by being attached to the actuator housing. In this configuration, the mobile component of the LVDT 11 can only be displaced linearly inside the LVDT body 17 (fixed part), which itself remains static relative to the actuator housing 1. The rotation of the mobile component 18 of the LVDT 11 relative to the actuator rod 13 is prevented by fastening elements (not shown) connected to the actuator rod 13 and the rotation of the LVDT body 17, or fixed component, is prevented by fastening elements (not shown) connected to the actuator housing 1. Linear motion between both of these parts of the LVDT 11 is generated by motion of the actuator rod 13 in response to the position order as mentioned above. For proper operation of the LVDT 11, there should be no relative rotational movement between the two components of the LVDT 11.

The fixed component 15 of the anti-rotation device of FIG. 1 also comprises a hollow cylindrical tube component that is positioned around and contacts the outer circumference of the LVDT body 17 in use. This fixed component 15 of the anti-rotation device 12 is fixed to the outer surface of the LVDT body and to the actuator housing 1. Both the fixed component 15 of the anti-rotation device 12 and the LVDT body 17 are prevented from rotating with respect to the actuator housing 1 by virtue of being attached to the actuator housing 1.

In order to prevent rotation of the actuator rod 13 in use, the first fixed and mobile components 15, 16 are brought into contact with each other. The rotation is prevented by the corresponding respective shapes of the first fixed and mobile components 15, 16 such as splines, square sections or using additional components such as rollers or balls.

The examples described herein aim to provide a new type of LVDT that can be used in an EMA (or other technology) that has a reduced sized envelope. These new examples are related to an anti-rotation component 160 of the mechanical converter output element (actuator rod 13).

Figure 2:
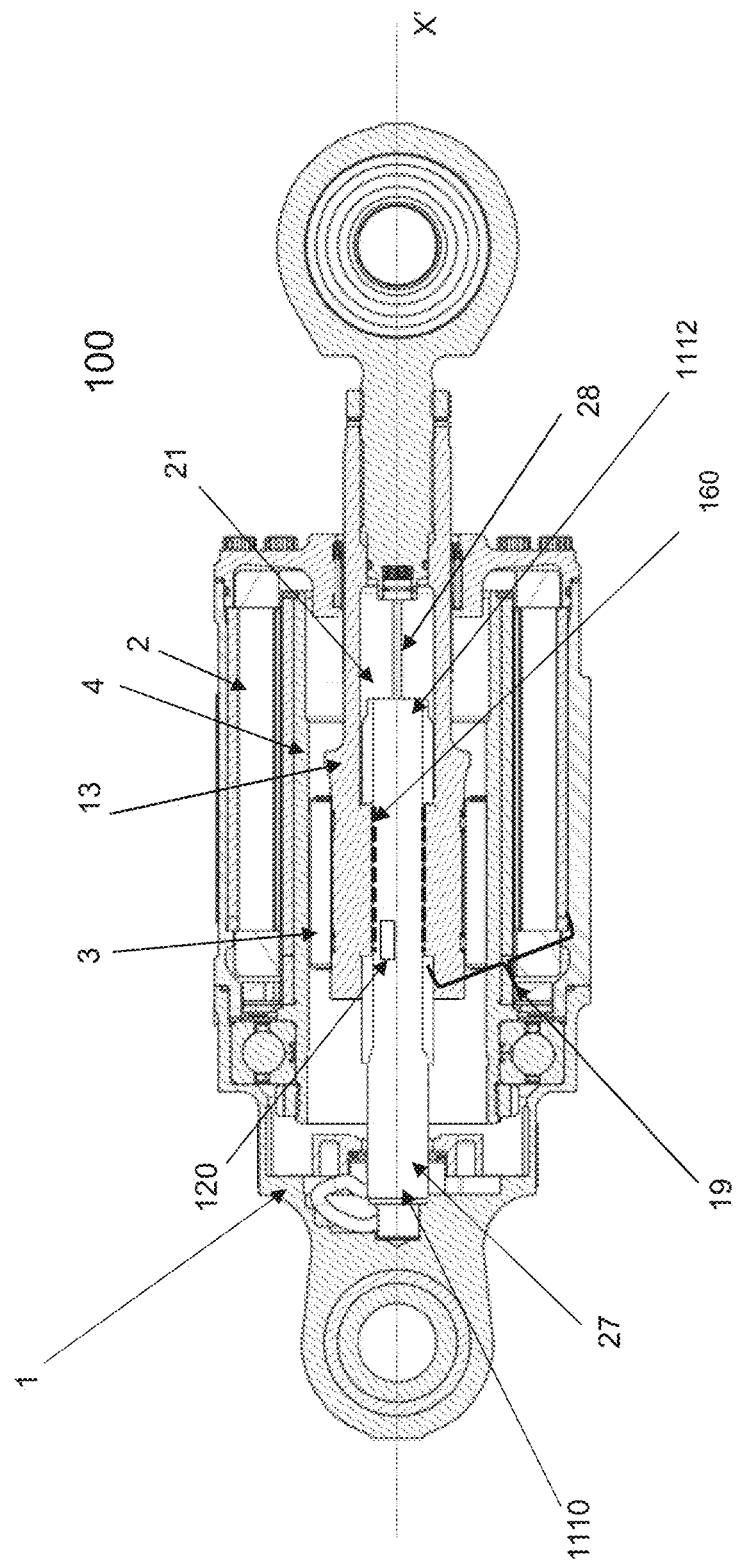
FIG. 2 shows a new type of LVDT in use in an EMA.

A new example of an LVDT 21 is shown in FIG. 2. As can be seen in this figure, the EMA 100 comprises an LVDT body 27, which is the fixed part of the LVDT 21, that extends along a longitudinal axis X' which corresponds to the longitudinal axis of the actuator rod 13 and of the EMA 100 itself. This LVDT 21 also includes a mobile rod part, the LVDT rod 28. The LVDT body 27 extends between a first longitudinal end 1110 of the LVDT body 27 and a second longitudinal end 1112 of the LVDT body 27. In this example, the LVDT body 27 remains fixed to the actuator housing 1 as in known systems.

The LVDT body 27 outer surface itself comprises an anti-rotation external shape 120 (not shown), or a plurality of anti-rotation external shapes 120. Examples of such shapes 120 can be splines, keys or square sections. Other than for the addition of this feature, the LVDT 21 does not need to be altered and the LVDT rod 28 is attached to the actuator rod 13 in use, as in known systems.

Figure 3:
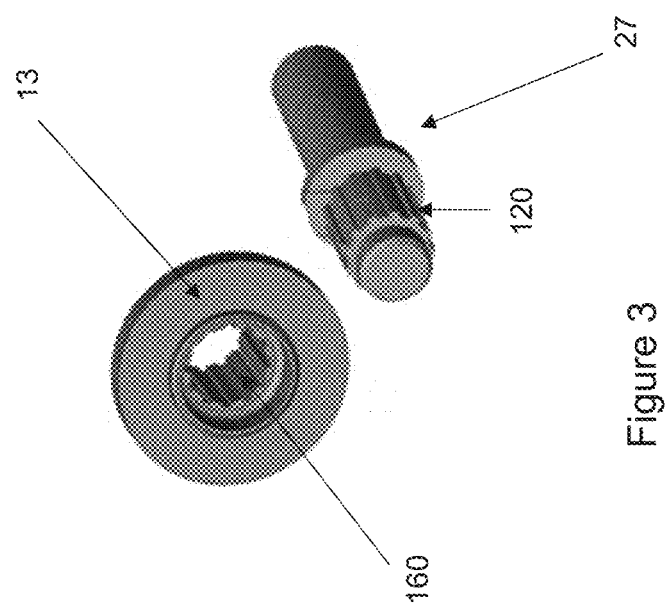
FIG. 3 shows the new type of LVDT and an actuator rod.

An anti-rotation component 160 is also provided. As shown in FIG. 3, the anti-rotation component 160 comprises anti-rotation shapes directly machined onto the inner surface of the output element of the mechanical converter 19, which in this case is the actuator rod 13. The anti-rotation shapes 120 provided on the outer surface of the LVDT body 27 are designed and manufactured so as to correspond in shape and size with the shapes provided on the inner surface of the anti-rotation component 160 which surrounds it. Due to this, the anti-rotation shapes 120 provided on the LVDT body 27 in combination with the anti-rotation component 160 on the actuator rod 13 inner diameter are able to prevent rotation by interaction with one another when they come into contact with each other and rotationally lock in place relative to each other.

It can be seen, when comparing the known LVDT 11 (which has two anti-rotation components (fixed component 15 and mobile component 16) surrounding the outer circumference of the LVDT body 17), with the new LVDT 21 shown in FIG. 2 (which only requires one anti-rotation component 160 machined onto the inner surface of the actuator rod 13 to be surrounding the outer circumference of the LVDT body 27 by virtue of having anti-rotation shapes 120 as part of the outer surface of the LVDT body 27 itself rather than such shapes being disposed on a separate fixed component 15 as in the aforementioned known systems), the new LVDT 21 has the advantage that, when used in an EMA, there is a reduced envelope in the actuator rod area. This, in turn, means, for example, if the EMA is provided in the wing of an aircraft, the aircraft wing can also be manufactured to be thinner and lighter. The new LVDTs also provide a reduction in cost as one component is able to provide two functions, both provided by one manufacturer.

The examples described herein reduce the overall cost of providing the antirotation function to an EMA and therefore the manufacturing cost of the actuator. As mentioned above, this saving is achieved by no longer having a dedicated component for the anti-rotation function.

The bill of material of the actuator is reduced by at least two part numbers and the actuator assembly time is also reduced because there are at least two parts which will no longer need to be mounted. At last, it is expected that only one manufacturer will be able to design and produce that new LVDT with integrated antirotation against at least two different manufacturer with the current design (one for LVDT and other for anti-rotation device).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An electromechanical actuator, comprising:
   an actuator rod housed in an actuator housing;
   a linear variable differential transformer (LVDT) fixed to the actuator housing and having an LVDT body having an outer surface that includes a first anti-rotation surface feature; and
   an anti-rotation component configured to contact the outer surface of the LVDT,
   wherein said anti-rotation component comprises:
   a second anti-rotation surface feature, and
   wherein said first and second anti-rotation features are sized and shaped relative to each other such that, when in contact with each other, they prevent rotation of the actuator rod in use;
   wherein the electromechanical actuator further comprises:
   a motor; and
   a mechanical converter configured to transform torque produced by the motor into linear force applied to said actuator rod;
   wherein the actuator rod comprises a hollow cylindrical region surrounding the LVDT; and
   wherein said anti-rotation component is directly machined onto an inner surface of the actuator rod and is positioned around the outer surface of the LVDT body.

2. The electromechanical actuator of claim 1, wherein said anti-rotation component is positioned between the mechanical converter and the linear variable differential transformer in use.

3. The electromechanical actuator of claim 1, wherein said anti-rotation component is positioned between the actuator rod and the linear variable differential transformer in use.

4. The electromechanical actuator of claim 1, wherein said LVDT extends along a central longitudinal axis X' between a first longitudinal end and a second longitudinal end.

5. The electromechanical actuator of claim 1, wherein said anti-rotation component is directly machined onto the inner surface of the actuator rod and is positioned around the external surface of the LVDT.

6. The electromechanical actuator of claim 1, wherein said anti-rotation surface features are splines, keys or square shaped sections.

7. A method of preventing rotation of an actuator rod in an electromechanical actuator, comprising:
   providing said actuator rod housed in an actuator housing;
   providing a linear variable differential transformer (LVDT) fixed to the actuator housing;
   providing an anti-rotation component configured to contact the outer surface of said LVDT;
   providing a first anti-rotation surface feature or features on said outer surface of the linear variable differential transformer;
   providing a second anti-rotation surface feature or features on said anti-rotation component;
   wherein said first and second anti-rotation features are sized and shaped relative to each other such that, when in contact with each other, they are configured to prevent rotation of actuator rod in use;
   providing a motor; and
   providing a mechanical converter configured to transform torque produced by the motor into linear force applied to said actuator rod;
   wherein the actuator rod comprises a hollow cylindrical region surrounding the LVDT; and
   wherein said anti-rotation component is directly machined onto the inner surface of the actuator rod and is positioned around the external surface of the LVDT.

8. The method of claim 7, further comprising:
   positioning said anti-rotation component between the mechanical converter and the linear variable differential transformer in use.

9. The method of claim 7, further comprising:
   positioning said anti-rotation component between the actuator rod and the linear variable differential transformer.

10. The method of claim 7, wherein said anti-rotation surface features are splines, keys or square shaped sections.

* * * * *